US012415101B2

(12) United States Patent
Hrouzek et al.

(10) Patent No.: US 12,415,101 B2
(45) Date of Patent: Sep. 16, 2025

(54) FALL PROTECTION SHUTTLE APPARATUS AND METHODS OF USING THE SAME

(71) Applicant: HONEYWELL SAFETY PRODUCTS USA, INC., Charlotte, NC (US)

(72) Inventors: Jan Hrouzek, Brno (CZ); Vaclav Hruza, Brno (CZ); Mehmet Koru, Brno (CZ)

( * ) Notice: Subject to any disclaimer, the term of this patent is extended or adjusted under 35 U.S.C. 154(b) by 718 days.

(21) Appl. No.: 17/664,819

(22) Filed: May 24, 2022

(65) Prior Publication Data

US 2023/0381556 A1 Nov. 30, 2023

(51) Int. Cl.

*A62B 35/00* (2006.01)
*A62B 35/04* (2006.01)
*E06C 7/18* (2006.01)

(52) U.S. Cl.

CPC ........ *A62B 35/0062* (2013.01); *A62B 35/005* (2013.01); *A62B 35/0081* (2013.01); *E06C 7/187* (2013.01); *A62B 35/04* (2013.01)

(58) Field of Classification Search

CPC ....... A62B 35/0062; A62B 35/04; A62B 1/14; A62B 35/005; A62B 35/0081; E06C 7/18; E06C 7/186; E06C 7/187
See application file for complete search history.

(56) References Cited

U.S. PATENT DOCUMENTS 3,437,178 A * 4/1969 Postlethwait .......... A62B 35/04 182/5
4,034,828 A * 7/1977 Rose ........................ A62B 1/14 182/5

(Continued)

FOREIGN PATENT DOCUMENTS

DE 10224681 A1 12/2003
EP 3337573 B1 10/2020

(Continued)

OTHER PUBLICATIONS

Extended European Search Report Mailed on Oct. 6, 2023 for EP Application No. 23172674, 5 page(s).

(Continued)

*Primary Examiner* — Colleen M Chavchavadze
*Assistant Examiner* — John W Hanes, Jr.
(74) *Attorney, Agent, or Firm* — Fredrikson & Byron, P.A.

(57) ABSTRACT

Various embodiments are directed to shuttle apparatuses for fall protection and methods of using the same. In various embodiments, a shuttle apparatus comprises a shuttle housing configured for dynamic engagement relative to a guide member, a first brake assembly configured for activation during a fall instance, and a secondary brake assembly configured independent from the first brake assembly, the secondary brake assembly comprising: a secondary brake pawl configured to pivotably rotate between a disengaged position and an activated position, the secondary brake pawl configured to rotate toward the activated position during the fall instance; and a secondary brake lock arm configured to freely rotate independent of the shuttle housing such that the shuttle housing being arranged in an angled configuration causes the secondary brake lock arm to rotate to an engaged position to obstruct the secondary brake pawl from rotating, thereby preventing the secondary brake assembly from being activated.

20 Claims, 9 Drawing Sheets

(56) References Cited

U.S. PATENT DOCUMENTS

| | | | | | |
|---|---|---|---|---|---|
| 4,269,284 | A * | 5/1981 | Swager | E06C 7/187 | 182/8 |
| 4,560,029 | A * | 12/1985 | Dalmaso | E04G 21/3261 | 182/112 |
| 4,657,110 | A * | 4/1987 | Wolner | A62B 1/14 | 182/5 |
| 5,265,696 | A * | 11/1993 | Casebolt | A62B 1/14 | 182/8 |
| 5,323,873 | A * | 6/1994 | Pelofi | A62B 1/14 | 182/4 |
| 5,638,919 | A * | 6/1997 | Pejout | A62B 1/14 | 182/5 |
| 5,934,408 | A * | 8/1999 | Flux | A62B 35/04 | 182/5 |
| 6,019,195 | A * | 2/2000 | Pelofi | A62B 1/14 | 188/65.2 |
| 6,457,556 | B1 * | 10/2002 | Skade | A62B 35/04 | 188/371 |
| 6,725,969 | B1 * | 4/2004 | Meister | A62B 35/0081 | 182/36 |
| 6,793,046 | B2 * | 9/2004 | Petzl | A62B 1/14 | 188/65.1 |
| 6,837,337 | B2 * | 1/2005 | Thomas | A62B 1/14 | 182/8 |
| 7,708,116 | B2 * | 5/2010 | Martin | A62B 1/14 | 182/8 |
| 8,584,797 | B2 | 11/2013 | Krauss | | |
| 9,132,297 | B2 * | 9/2015 | Casebolt | F16B 2/18 | |
| 9,168,402 | B2 * | 10/2015 | Casebolt | A62B 35/005 | |
| 10,047,560 | B2 * | 8/2018 | Roth | A62B 35/0081 | |
| 10,137,323 | B2 * | 11/2018 | Roth | A62B 35/0062 | |
| 10,245,452 | B2 * | 4/2019 | Ollivier | A62B 1/14 | |
| 10,760,336 | B2 * | 9/2020 | Hwang | E06C 7/186 | |
| 10,953,247 | B2 * | 3/2021 | Muessig | A62B 35/0081 | |
| 2011/0186388 | A1 | 8/2011 | Sudale et al. | | |
| 2019/0099625 | A1 * | 4/2019 | Muessig | A63B 29/02 | |
| 2019/0282842 | A1 * | 9/2019 | Voss | E06C 7/187 | |
| 2020/0346671 | A1 * | 11/2020 | Šulc | F16G 11/10 | |
| 2021/0101031 | A1 | 4/2021 | Bornack et al. | | |
| 2021/0128955 | A1 * | 5/2021 | Marak | A62B 35/0081 | |
| 2021/0178195 | A1 | 6/2021 | Muessig | | |
| 2021/0220680 | A1 | 7/2021 | Novotny et al. | | |
| 2021/0299490 | A1 * | 9/2021 | Sulc | B29C 70/00 | |
| 2022/0203145 | A1 * | 6/2022 | Liu | A62B 35/0081 | |
| 2023/0381556 | A1 * | 11/2023 | Hrouzek | A62B 35/0062 | |
| 2023/0398383 | A1 * | 12/2023 | Hrouzek | A62B 35/0081 | |

FOREIGN PATENT DOCUMENTS

| | | | | |
|---|---|---|---|---|
| GB | 2471285 | A * | 12/2010 | A62B 1/14 |
| WO | 2009/153147 | A1 | 12/2009 | |
| WO | 2017/030558 | A1 | 2/2017 | |

OTHER PUBLICATIONS

3M, "3M™M DBI-SALA® Lad-Saf™ Cable Vertical Safety System 6118050, Galvanized Steel, 50 FT", retrieved from the Internet at <URL: https://www.3mindia.in/3M/en_IN/p/d/v100686042/> on Jan. 30, 2023, 4 pages.

Communication about intention to grant a European patent Mailed on Feb. 13, 2025 for EP Application No. 23172674, 6 page(s).

Communication about intention to grant a European patent Mailed on Oct. 11, 2024 for EP Application No. 23172674, 6 page(s).

* cited by examiner

FALL PROTECTION SHUTTLE APPARATUS AND METHODS OF USING THE SAME

FIELD OF THE INVENTION

Various embodiments described herein relate generally to fall protection systems and, more particularly, to fall protection shuttle apparatuses.

BACKGROUND

From recreation to survival devices, fall protection devices are instrumental in preserving the safety of users during traversal of uncertain conditions and heights. In order to operate effectively, protection devices must be able to freely travel along a guide member to allow freedom of movement, while also allowing for effective and efficient activation of one or more brake assemblies configured to secure the position of the shuttle along a guide member arranged in either a tilted or vertical configuration. Applicant has identified a number of deficiencies and problems associated with current fall protection devices. Through applied effort, ingenuity, and innovation, many of these identified problems have been solved by the methods and apparatus of the present disclosure.

BRIEF SUMMARY

Various embodiments are directed to a shuttle apparatus for a fall protection device and methods of using the same. In various embodiments, an exemplary shuttle apparatus may comprise a shuttle housing configured for dynamic engagement relative to a guide member such that the shuttle housing is secured relative to the guide member and movable along a length of the guide member; a first brake assembly configured to be activated during a fall instance, wherein activation of the first brake assembly causes a first braking portion to engage the guide member; a secondary brake assembly configured independent from the first brake assembly, the secondary brake assembly comprising: a secondary brake pawl configured to pivotably rotate about a secondary brake pawl pivot pin between a disengaged position and an activated position, the secondary brake pawl configured to rotate toward the activated position during the fall instance; and a secondary brake lock arm configured to freely rotate independent of the shuttle housing such that the shuttle housing being arranged in an angled configuration relative to a vertical axis causes the secondary brake lock arm to be rotated relative to the shuttle housing to an engaged position, wherein the secondary brake lock arm in the engaged position is configured to obstruct a rotation of the secondary brake pawl to prevent the secondary brake assembly from being activated during the fall instance.

In various embodiments, the secondary brake lock arm may be configured to freely rotate about a secondary brake lock arm pivot pin disposed within the shuttle housing, and wherein the secondary brake lock arm in the engaged position obstructs a rotation of the secondary brake pawl by physically engaging the secondary brake pawl in the disengaged position to prevent the secondary brake pawl from rotating to the activated position. In certain embodiments, the secondary brake lock arm pivot pin may define an axis of rotation, the axis of rotation being defined at least substantially adjacent an upper portion of the secondary brake lock arm. In certain embodiments, a lock arm center of gravity of the secondary brake lock arm may be defined at least substantially directly below the lock arm axis of rotation. Further, in certain embodiments, the secondary brake pawl may comprise at least one pawl lock arm interface feature configured to be engaged by the secondary brake lock arm when the secondary brake lock arm is in the engaged position, wherein the secondary brake lock arm physically engages the secondary brake pawl in the disengaged position at the one pawl lock arm interface feature to facilitate the deactivation of the secondary brake assembly. In certain embodiments, the at least one pawl lock arm interface feature may be defined along an at least substantially bottom portion of the secondary brake pawl. In certain embodiments, the secondary brake lock arm may comprise a lock arm engagement element defined at a distal end thereof, the lock arm engagement element being configured to engage the at least one pawl lock arm interface feature of the secondary brake pawl when the secondary brake lock arm is in the engaged position. Further, the at least one pawl lock arm interface feature may be defined by a configuration that corresponds to that of the lock arm engagement element such that the at least one pawl lock arm interface feature is configured to receive at least a portion of the lock arm engagement element.

In various embodiments, a pawl center of gravity of the secondary brake pawl is defined towards the first braking portion. In various embodiments, the secondary brake assembly may define an inertial system, the secondary brake assembly being configured to be activated during the fall instance based at least in part on a variance in a gravitational force acting on the secondary brake pawl, the variance in the gravitational force being caused by the fall instance. In certain embodiments, the secondary brake assembly may comprise a secondary brake spring configured to bias the secondary brake pawl against rotation due to gravity in an instance in which the locking system has little or no movement. In certain embodiments, the variance in the gravitational force caused by the fall instance may be defined by a decrease in the gravitational force acting against the secondary brake spring, and wherein the secondary brake spring is calibrated to the gravitational force acting on the secondary brake pawl in a non-fall instance such that, in a fall instance, the secondary brake pawl is biased to rotate about the secondary brake pawl pivot pin toward the activated position.

In various embodiments, the secondary brake pawl may comprise a second braking portion configured to be positioned external to the shuttle housing in the activated position, wherein activation of the first brake assembly causes the second braking portion to engage the guide member. In various embodiments, the secondary brake lock arm being arranged in the engaged position to prevent the secondary brake assembly from being activated during the fall instance may comprise the secondary brake lock arm retaining the second braking portion of the secondary brake pawl within an interior housing portion defined within the shuttle housing such that the secondary brake pawl does not extend through a brake engagement slot defined along a distal end of the shuttle housing. In various embodiments, the second brake assembly may be configured such that, upon the shuttle housing being rearranged from the angled configuration to a vertical configuration defined by a shuttle tilt angle that is at least substantially zero, the secondary brake lock arm is rotated relative to the shuttle housing from the engaged position to a nominal position, wherein the secondary brake lock arm in the nominal position is configured to allow the rotation of the secondary brake pawl from a disengaged position to an activated position in the fall instance. In various embodiments, the secondary brake lock arm being rotated relative to the shuttle housing based at least in part on the angled configuration of the shuttle housing may be defined by the secondary brake lock arm at least substantially maintaining a nominal position relative to the vertical axis.

In various embodiments, the secondary brake assembly may be configured such that, based at least in part on the angled configuration of the shuttle housing, the secondary brake lock arm is fully rotated relative to the shuttle housing from a nominal position to the engaged position before the shuttle apparatus being tilted to an increased angled configuration defined by a maximum shuttle tilt angle threshold, wherein the maximum shuttle tilt angle threshold is defined by a shuttle tilt angle value at which the secondary brake pawl initiates a rotation caused by a variance in gravitational forces resulting from the increased angled configuration. In various embodiments, the secondary brake assembly may be configured such that the secondary brake lock arm is arranged in the engaged position upon the angled configuration of the shuttle housing being defined by a shuttle tilt angle that is between 10 degrees and 20 degrees relative to the vertical axis. In various embodiments, the shuttle apparatus may further comprise one or more guide wheel assemblies configured to engage one or more surfaces of the guide member to facilitate a relative movement of the shuttle apparatus along the length of the guide member. In various embodiments, the first brake assembly may be configured to move independently of the secondary brake pawl of the secondary brake assembly such that as the secondary brake lock arm is preventing the second brake assembly from being activated during the fall instance, the first brake assembly may be activated to provide a stopping force relative to the guide member.

BRIEF DESCRIPTION OF THE DRAWINGS

Reference will now be made to the accompanying drawings, which are not necessarily drawn to scale, and wherein.

DETAILED DESCRIPTION

Figure 1A:
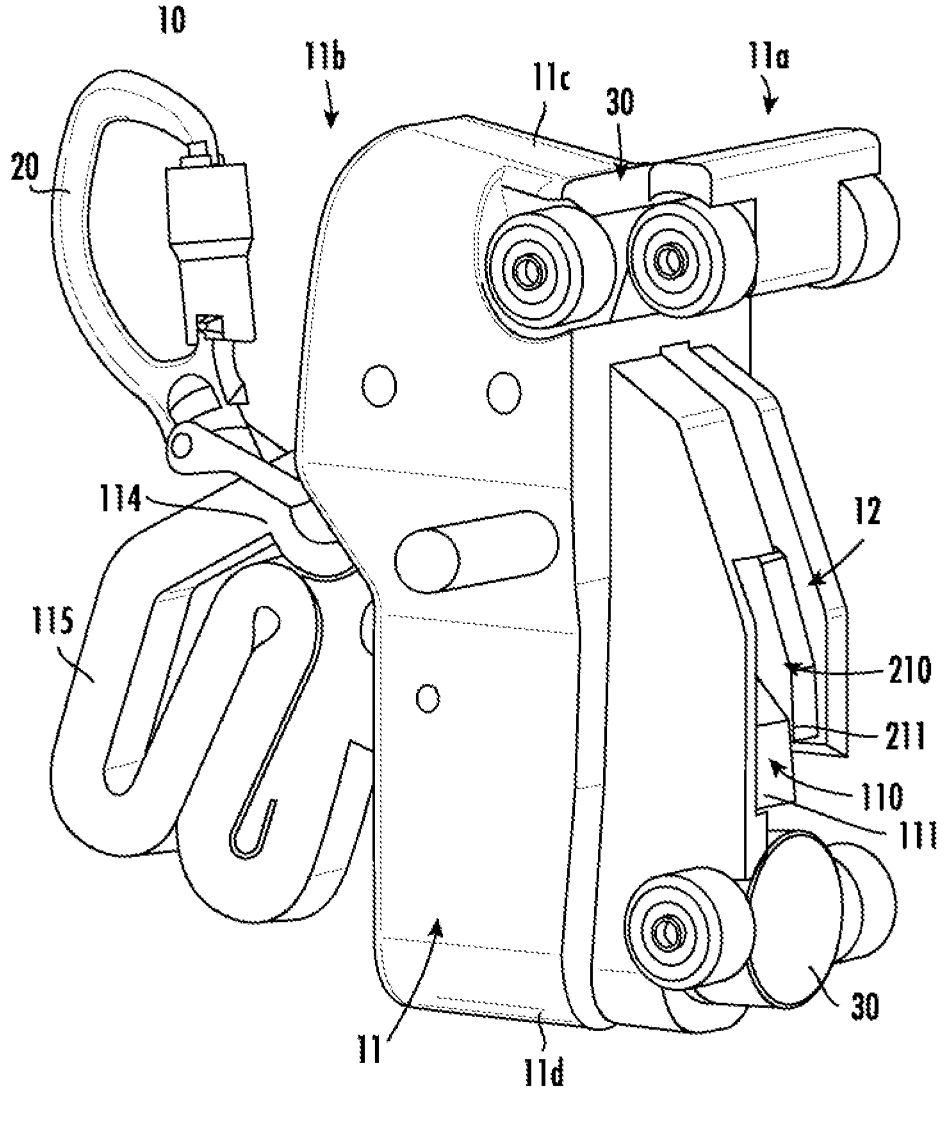
FIGS. 1A-1B illustrate various exterior view of an example embodiment of a shuttle apparatus in accordance with the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

The present disclosure provides various example shuttle apparatuses having a second brake assembly configured for independent activation in fall instances to provide a stopping force sufficient to prevent further movement of the shuttle apparatus in a downward direction (e.g., in a vertical direction towards a ground surface) along the length of the guide member as a redundant safety mechanism used to supplement the functionality of a first brake assembly. Various embodiments allow for a secondary brake assembly configured to be automatically deactivated in an exemplary circumstance wherein the tilt angle of the guide member to which the shuttle apparatus is dynamically engaged is sufficiently large so as to inadvertently cause the secondary brake assembly to be actuated based on the angled configuration of the shuttle apparatus rather than the existence of a fall condition. For example, various embodiments include a secondary brake assembly comprising a secondary brake lock arm configured to freely rotate independent of the shuttle housing such that, upon the shuttle apparatus being arranged in an angled configuration relative to a vertical axis, the secondary brake lock arm may be automatically rotated relative to the shuttle housing to an engaged position such that the secondary brake lock arm can obstruct the secondary brake pawl from being prematurely rotated from a disengaged position to an activated position. As described herein, the secondary brake lock arm is configured to be automatically rotated relative to the secondary brake pawl to an engaged position wherein the lock arm may effectively retain the secondary brake pawl in a disengaged position within the shuttle apparatus housing, thereby effectively automatically deactivating the secondary brake assembly in exemplary circumstances wherein the angled configuration of the shuttle apparatus represents a high risk of a user being placed in a dangerous condition and/or the second brake assembly of the shuttle apparatus malfunctioning.

Figure 1B:
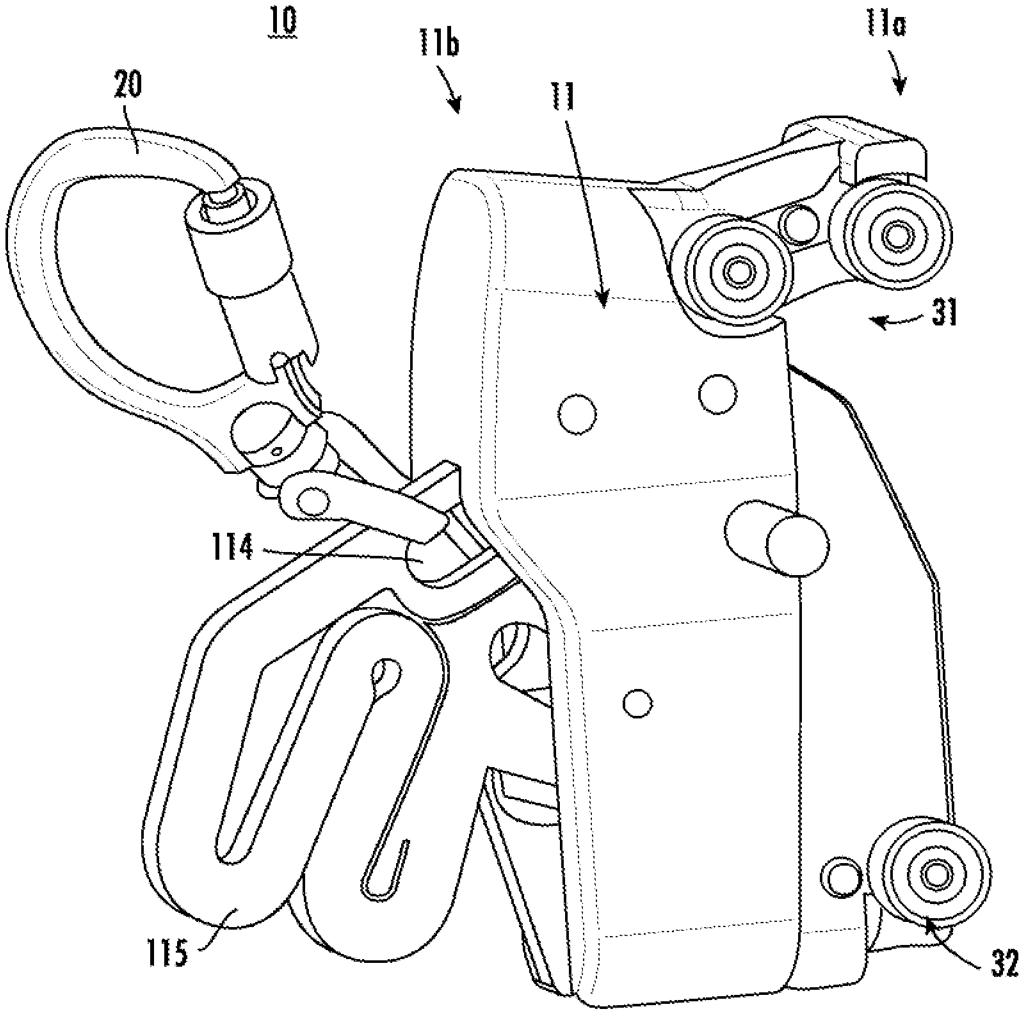

Referring now to FIGS. 1A-1B, various perspective views of an exemplary shuttle apparatus in accordance with various embodiments described herein are provided. In particular, FIGS. 1A and 1B illustrate perspective views of an exemplary shuttle apparatus embodying a shuttle apparatus configured to facilitate a secure connection between a guide member wearable and a retention device secured to a user (e.g., a wearable harness connected to an attachable interface such as a hook, a carabiner, and/or the like) while being moveable along the length of the guide member to allow for user movement therealong. As described in further detail herein, the exemplary shuttle apparatus 10 may be configured to engage a guide member (not shown) that is positioned, for example, on an elevated surface and may be configured to prevent one attached thereto from falling off the elevated surface by stabilizing the secure connection upon detecting a pull force in either a downward direction (e.g., a direction towards a ground surface) or a direction away from the portion of the guide member to which the shuttle apparatus is attached (e.g., in a fall direction during a "fall event"), thereby substantially mitigating the risk of detachment from the guide member.

In various embodiments, as illustrated in FIGS. 1A and 1B, an exemplary shuttle apparatus 10 may comprise a shuttle housing 11, a connector element 20, one or more guide wheel assemblies 30, a first brake assembly 100, and a secondary brake assembly 200. In various embodiments, a shuttle housing 11 may define a distal end 11*a*, a proximal end 11*b*, an upper end 11*c*, and a lower end 11*d*. An exemplary shuttle apparatus 10 is configured to be secured relative a guide member, such as, for example, a rail, a cable, and/or the like, such that, upon being installed relative to the guide member, the distal end 11*a* of the shuttle housing 11 is positioned at least substantially adjacent and/or within a portion of the guide member. The proximal end may be defined by a second end (e.g., a second lateral end) of the shuttle housing 11 opposite the distal end 11*a* that is proximate the connector element 20.

Figure 2:
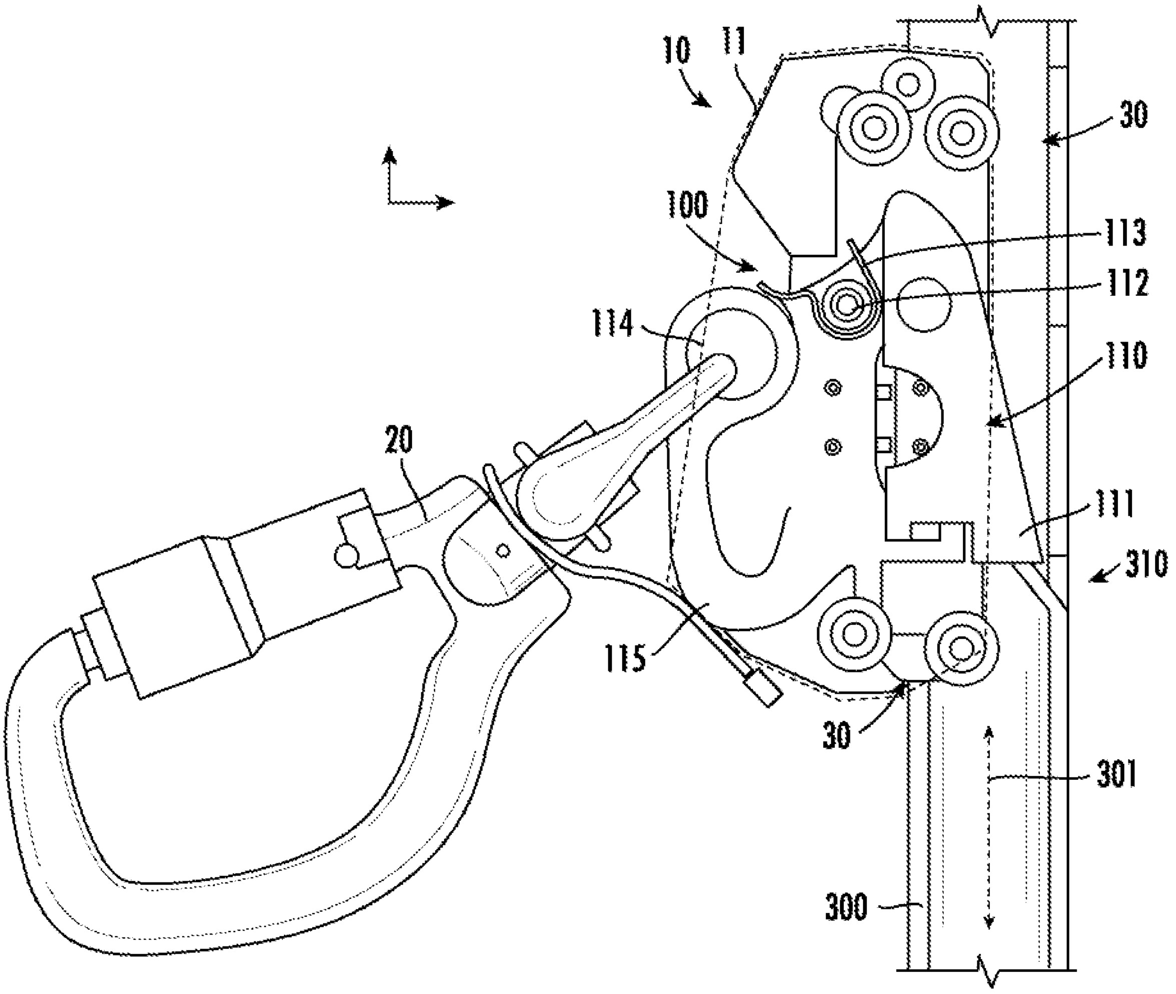
FIG. 2 illustrates side cross-sectional view of an exemplary shuttle apparatus configured for dynamic engagement with a guide member in accordance with various embodiments described herein.

In various embodiments, the one or more guide wheel assemblies 30 may be configured to engage one or more surfaces of a guide member to facilitate relative movement of the shuttle apparatus 10 along the length of the guide member. For example, the one or more guide wheel assemblies 30 may comprise a first guide wheel assembly 31 and a second guide wheel assembly 32, each comprising at least one guide wheel positioned along a distal end 11*a* of the shuttle housing 11 and to configured to freely travel along the guide member, such that the housing 11 remains dynamically engaged with the guide member (e.g., the guide member 300, as shown in FIG. 2) during operation. In such an exemplary configuration, the guide member, as described in further detail herein, may define a guide path embodying a range motion of the shuttle apparatus 10 defined along at least a portion of the length of the guide member, throughout which the shuttle apparatus 10 may travel during operation. In such an exemplary configuration, as illustrated, the first guide wheel assembly 31 may be positioned adjacent an upper end 11*c* of the shuttle housing 11 and the second guide wheel assembly 32 may be positioned adjacent a lower end 11*d* of the shuttle housing 11.

In various embodiments, an exemplary shuttle housing 11 may embody an exterior shell comprising one or more sidewalls configured to define an interior housing portion therein, within which the one or more brake assemblies of the shuttle apparatus 10 may be housed. For example, the shuttle housing 11 may comprise a unitary piece, or, alternatively, may by defined by a base housing component to which one or more of the brake assemblies described herein are pivotably secured, and a cover plate configured to be secured relative to the base housing portion so as to collectively define the interior housing portion. In various embodiments, shuttle housing 11 may comprise one or more brake engagement slots 12 embodying an elongated opening extending through one or more sidewalls of the shuttle housing 11 defined along the distal end 11*a*. The one or more brake engagement slots 12 may be configured such that at least a portion of each of the brake assemblies, such as, for example, a first brake surface 111 of a first brake lever of a first brake assembly or a second brake surface 211 of a secondary brake pawl of a secondary brake assembly may protrude therethrough in order to engage a portion of the guide member and facilitate a braking operation during a fall instance. As illustrated in FIG. 1A, brake engagement slots 12 may comprise an elongated opening (e.g., a slot) defined at least in part by a length that extends along the distal end 11*a* of the shuttle housing 11 to enable reconfiguration of both the first brake lever 110 and the secondary brake pawl 210, as described herein, to their respective activated configurations defined at least in part by a braking portion thereof (e.g., first braking portion 111, second braking portion 211) being positioned outside of the shuttle housing 11.

In various embodiments, an exemplary shuttle apparatus 10 may comprise one or more brake assemblies, including a first brake assembly 100 and a secondary brake assembly 200, each configured to execute a respective braking operation independent of one another during a fall instance by being configured to automatically engage at least a portion of the guide member to provide a stopping force sufficient to prevent further movement of the shuttle apparatus 10 in a downward direction (e.g., in a vertical direction towards a ground surface) along the length of the guide member. For example, a fall instance may be defined as an instance in which a predetermined force is achieved, usually based on a user falling. As described in further detail herein, the shuttle apparatus 10 may be configured such that in a fall instance at least a portion of each of the first brake assembly 100 (e.g., a first braking portion 111 of a first brake lever 110) and the secondary brake assembly 200 (e.g., a second braking portion 211 of a secondary brake pawl 210) are reconfigured (e.g., rotated about a respective pivot pin) to an activated position defined by the least a portion of each of the first and secondary brake assemblies 100, 200 protruding from the distal end 11*a* of the shuttle housing 11 via the one or more brake engagement slots 12 to physically engage the guide member.

In various embodiments, a first brake assembly 100 of an exemplary shuttle apparatus 10 may comprise a first brake lever 110 rotatably connected to a first brake lever pivot pin secured within the interior housing portion of the shuttle housing 11, such as, for example, to an interior surface of one or more shuttle housing 11 sidewalls. As illustrated, in various embodiments the first brake lever 110 may comprise a first brake portion 111 configured to, upon activation of the first brake assembly 100, as described herein, extend from the distal end 11*a* of the shuttle housing 11, and one or more arms extending outwardly from a proximal end 11*b* of the shuttle housing 11. For example, in various embodiments, the one or more arms of the first brake lever 110 may comprise a shock absorber 115 configured to permanently deform in an instance in which an extreme fall instance occurs. In various embodiments, the shuttle apparatus 10 may be designed based on the maximum falling speed of a user during operation. In various embodiments, the shock absorber 115 may include one or more hooks configured to disengage from one another in an instance in which a force is applied to the connector element 20, such as, for example, during a fall instance. A connector element 20, such as a carabiner, may be securely fastened to the first brake lever 110 at an attachment end 114, such that when a force is applied to the connector element 20 (e.g., during a fall instance), the force causes the rotation and deformation of the first brake lever 110. The connector element 20 is configured to be directly or indirectly connected to a user, such as, for example, to a wearable harness and/or a fastener anchor component (e.g., a hook) disposed thereon.

As an illustrative example, FIG. 2 illustrates a cross-sectional side view of an exemplary shuttle apparatus dynamically engaged with a guide member according to various embodiments described herein, In particular, FIG. 2 illustrates a cross-sectional side view of an exemplary shuttle apparatus 10 comprising a first brake assembly 100 and being configured for movement along a length of the guide member 300 so as to define a guide path 301 along which the shuttle apparatus 10 may be moved relative to guide member 300. For example, in various embodiments, a guide member 300 may comprise an elongated component, such as, for example, a guide rail, a rope, a cable, and/or the like, or any other elongated material component suitable for dynamic engagement of the shuttle apparatus 10, as described herein. For example, an exemplary guide member 300 may be configured to receive at least a portion of the shuttle apparatus 10, such as, for example, the one or more guide wheel assemblies 30, so as to facilitate the dynamic engagement of the shuttle apparatus 10 relative to guide member 300. In various embodiments, the guide member 300 may comprise one or more shuttle brake engagement features 310 distributed along the length of the guide member 300 and configured to engage at least a portion of a shuttle apparatus (e.g., a first brake portion 111 of the first brake assembly 100) when the brake assembly is in an activated position. For example, as illustrated in FIG. 2, a shuttle brake engagement feature 310 may comprise a material protrusion extending from a surface of the guide member 300 in a direction towards the shuttle apparatus 10 such that as an exemplary shuttle apparatus 10 comprising a first brake assembly 100 defined in an activated position travels in a downward direction (e.g., in the negative y-direction, as shown in the exemplary orientation of FIG. 2) along the guide path 301, such as, for example, in a fall instance, a first braking portion 111 of the first brake lever 110 that is protruding from the distal end 11*a* of the shuttle housing 11 may engage the shuttle brake engagement feature 310 and provide a stopping force sufficient to prevent further movement of the shuttle apparatus 10 in a downward direction (e.g., in a vertical direction towards a ground surface) along the length of the guide member.

In various embodiments, an exemplary shuttle apparatus 10 may be configured to be engaged with the guide member 300 such that the angled configuration of the shuttle apparatus 10 relative to an exemplary ground surface (e.g., an at least substantially horizontal floor surface upon which a bottom end of the guide member 300 is positioned) within a vertical plane, such as, for example, the y-x plane as defined in the exemplary orientation illustrated in FIG. 2, may correspond to a tilt of the guiding member that defines the angular configuration of the portion of the guide member 300 at which the shuttle apparatus 10 is positioned. For example, in an exemplary circumstance wherein a first portion of the guide member 300 defined along the guide path 301 defines an at least substantially vertical configuration that extends along a vertical axis in a perpendicular direction relative to a ground surface (e.g., in a y-direction as illustrated in the exemplary orientation shown in FIG. 2) and a second portion of the guide member 300 defined along the guide path 301 having an angular configuration relative to a vertical axis (e.g., an axis perpendicular to an at least substantially horizontal ground surface) that is defined by a non-zero angle (e.g., defining a non-vertical configuration), as described herein, the exemplary shuttle apparatus 10 may be arranged in a vertical configuration (e.g., relative to the ground surface) as it travels along the first portion of the guide member 300 and may be arranged in an angled configuration (e.g., relative to the ground surface) that is at least substantially equivalent to that of the second portion of the guide member 300 as it travels along the second portion of the guide member.

In various embodiments, a shuttle apparatus 10 may move (e.g., automatically) from an unlocked position, wherein the shuttle apparatus 10 may travel along the guide member 300 (e.g., along guide path 301 with minimal resistance, and a locked position, wherein one or more of the brake assemblies (e.g., a first brake assembly 100 and/or a secondary brake assembly) of the shuttle apparatus 10 have been activated such that a portion thereof (e.g., a first braking portion 111 of the first brake lever 110) is extended from a distal end 11*a* of the shuttle housing 11 and engaged with at least a portion of the guide member 300 (e.g., a shuttle brake engagement feature 310) to restrict and/or stop motion of the shuttle apparatus 10 along the length of the guide member 300 (e.g., along guide path 301) in a downward direction (e.g., in the negative y-direction as shown in the orientation illustrated in FIG. 2).

In various embodiments, such as, for example, in the exemplary embodiment illustrated in FIG. 2, a first brake assembly 100 of an exemplary shuttle apparatus 10 may comprise a first brake lever 110 rotatably connected to a first brake lever pivot pin 112 secured within the interior housing portion of the shuttle housing 11. In various embodiments, the first brake lever 110 of an exemplary first brake assembly 100 may be configured to rotate throughout a range of relative rotational motion relative to the shuttle housing 11 between a disengaged position and an activated position, as illustrated in the exemplary embodiment depicted in FIG. 2, based at least in part on the occurrence of a fall instance causing a variance in one or more forces (e.g., a pulling force via a connector element 20, a gravitational force, a spring force, and/or the like) being applied to the first brake assembly 100. For example, an exemplary first brake lever 110 of the first brake assembly 100 may extend along a length between a proximal lever end that is pivotably secured to the first brake assembly pivot pin 112 and a distal lever end that defines the first braking portion 111. As described herein, a disengaged position of the first brake assembly 100 may be defined at least in part by the first brake lever 110 being arranged such that the first braking portion 111 is positioned within the interior housing portion of the shuttle housing 11. Further, in various embodiments, an activated position of the first brake assembly 100 may be defined by the first brake lever 110 being rotated from the disengaged position about the first brake assembly pivot pin 112 (e.g., in a counter clockwise direction according to the exemplary orientation illustrated in FIG. 2) relative to the shuttle housing 11 such that the first braking portion 111 protrudes from the distal end 11*a* of the shuttle housing 11 via the one or more brake engagement slots 12. For example, the first brake lever 110 may be configured such that, upon activation of the first brake assembly 100, the first braking portion 111 protruding from the shuttle housing 11 may physically engage a shuttle brake engagement feature 310 of the guide member 300 to prevent relative movement of the shuttle apparatus 10 in one or more directions along the guide path 301.

In various embodiments, the first brake assembly 100 may further comprise a first brake spring 113 configured to apply one or more forces to the first brake lever 110 to bias the rotation thereof about the first brake lever pivot pin 112. For example, in various embodiments, wherein the first brake assembly 100 is in a disengaged position, the first brake lever 110 may be spring biased by the first brake spring 113 such that the first brake lever 110 is not allowed to rotate about a center of rotation thereof, such as, for example, the first brake lever pivot pin 112. In various embodiments, the shuttle apparatus 10 may be able to withstand a threshold level of force on the connector element 20 without causing the first brake lever 110 to engage the guide member 300. For example, the shuttle apparatus 10 may be configured to withstand the force of a user during normal operating conditions (e.g., repealing) and may only activate the first brake lever 110 in an instance a certain force (e.g., a user falling at a certain speed) has been reached. In various embodiments, the activation force for the first brake lever 110 may be based on the design of the assembly.

As an illustrative example, in various embodiments and during a fall instance, the first brake lever 110 may be allowed to rotate such that the first braking portion 111 of the first brake lever 110 engages with the guide member 300 (e.g., at a shuttle brake engagement feature 310). Additionally or alternatively, the first brake lever 110 may be released to rotate based on the motion of the shuttle apparatus 10 along the guide member 300. In some embodiments, the force of the connector element 20 on the first brake lever 110 may cause the first brake lever 110 to rotate so as to cause disengagement at an attachment end 114 and/or the like. In such an exemplary circumstance, one or more forces acting on the attachment end 114 and/or a disengagement thereof may cause a downward rotation of the first brake lever 110 about the first brake assembly pivot pin 112, such as, for example, in a counterclockwise direction defined by the orientation illustrated in FIG. 2, such that the first braking portion 111 of the first brake lever 110 extends to an activated position and forcibly engages the guide member 300. In some embodiments, the shuttle apparatus 10 may include a spring (e.g., the first brake assembly spring 113 and/or another spring) to dissipate the rotational force of the first brake lever 110 (e.g., to avoid the braking lever from damaging and/or breaking the guide member 300).

Figure 3A:
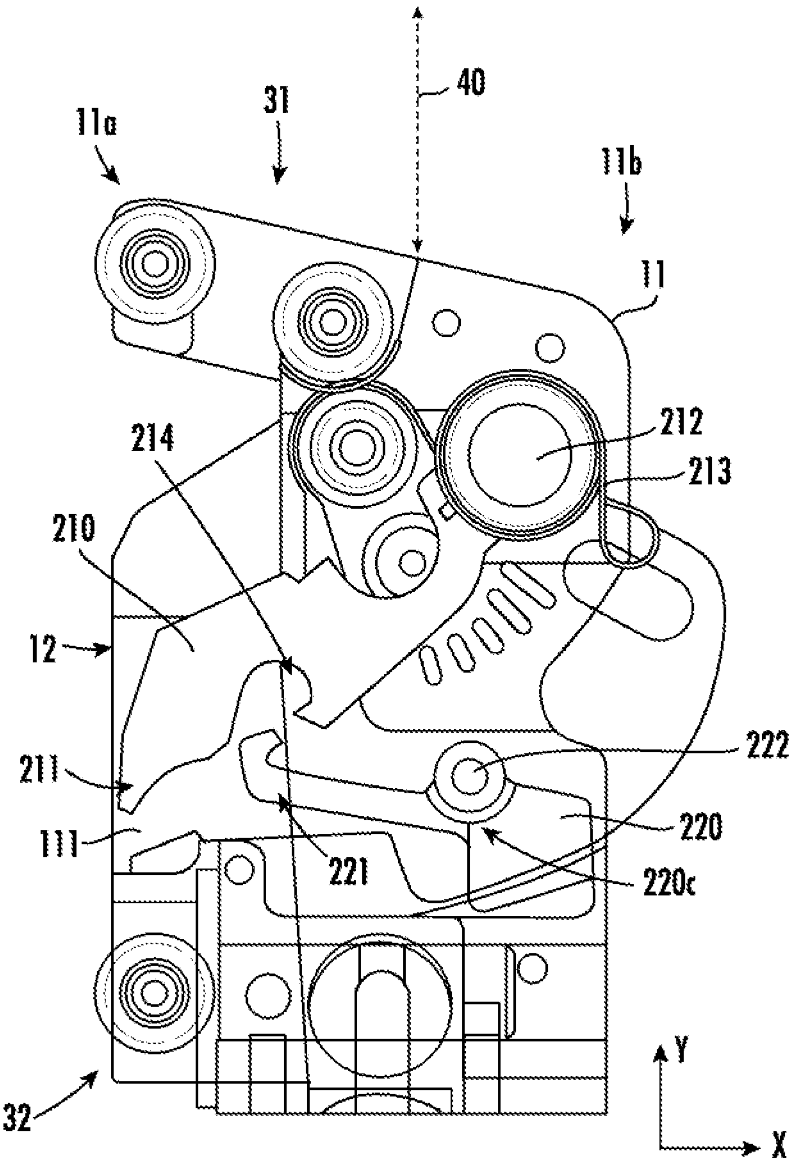
FIGS. 3A-3B illustrate various side cross-section views of exemplary shuttle apparatuses in accordance with various embodiments described herein.
Figure 3B:
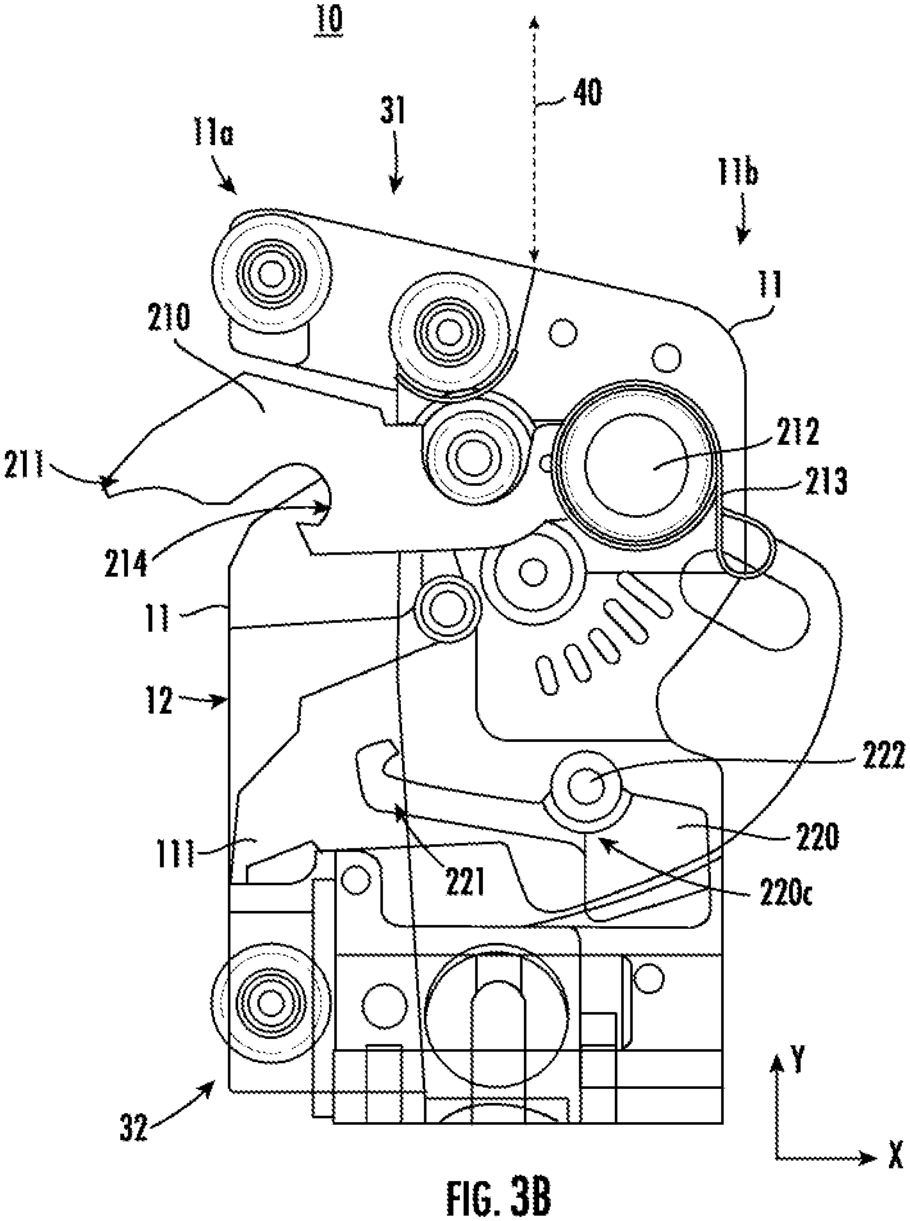

FIGS. 3A-3B illustrate various side cross-section views of exemplary shuttle apparatuses in accordance with various embodiments described herein. In particular, FIGS. 3A and 3B illustrate various side cross-section views of an exemplary shuttle apparatus 10 arranged in a vertical configuration (e.g., relative to an at least substantially horizontal ground surface upon which a guide member dynamically engaged with the apparatus is positioned) with a secondary brake pawl 210 of a secondary brake assembly 200 being arranged in a disengaged position (FIG. 3A) and an activated position (FIG. 3B), respectively. In various embodiments, a shuttle apparatus 10 may be configured in a locked position based at least in part on a secondary brake assembly 200 being activated such that a portion thereof (e.g., a second braking portion 211 of a secondary brake pawl 210) is extended from a distal end 11*a* of the shuttle housing 11 and engaged with at least a portion of the guide member to which the shuttle apparatus 10 is dynamically engaged, such as, for example, in order to restrict and/or stop motion of the shuttle apparatus 10 along the length of the guide member.

In various embodiments, such as, for example, in the exemplary shuttle apparatus 10 illustrated in FIGS. 3A and 3B, a secondary brake assembly 200 of an exemplary shuttle apparatus 10 may comprise a secondary brake pawl 210 and a secondary brake lock arm 220 configured to automatically deactivate the secondary brake assembly 200 upon the shuttle apparatus 10 being arranged in an angular configuration defined by a shuttle tilt angle (e.g., defined relative to a vertical axis 40 such as, for example, the y-axis depicted in the exemplary orientation illustrated in FIGS. 3A and 3B) that is above a predetermined threshold.

Figure 5:
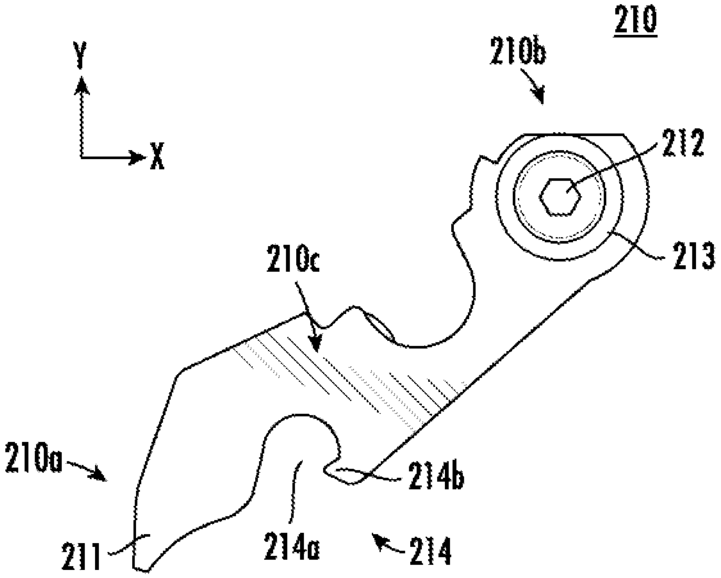
FIG. 5 illustrates side view of a secondary brake pawl of a secondary brake assembly in accordance with an example embodiment of the present disclosure.

In various embodiments, the secondary brake assembly 200 may comprise a secondary brake pawl 210 that is rotatably connected to a secondary brake pawl pivot pin 212 secured within the interior housing portion of the shuttle housing 11. For example, FIG. 5 illustrates a side view of an exemplary secondary brake pawl of a secondary brake assembly in accordance with an example embodiment of the present disclosure. As illustrated, an exemplary secondary brake pawl 210 of the secondary brake assembly 200 may extend along a length between a proximal pawl end 210*b* that is pivotably secured to the secondary brake pawl pivot pin 212 and a distal pawl end 210*a* that defines the second braking portion 211. In various embodiments, the first braking portion 211 of the secondary brake pawl 210 may have an at least partially curved profile, as shown, in order to facilitate robust engagement with the guide member 300 during operation. Further, in various embodiments, the secondary brake pawl 210 may be configured such that the center of gravity 210*c* of the secondary brake pawl 210 is towards the first braking portion 211 of the secondary brake pawl 210.

As described in further detail herein, the secondary brake pawl 210 may further comprise at least one pawl lock arm interface feature 214 configured to be engaged by a secondary brake lock arm to facilitate the deactivation of the secondary brake assembly. For example, the at least one pawl lock arm interface feature 214 may comprise a feature defined along the length of the secondary brake pawl 210, such as, for example, a protrusion, a material recess, a slot and/or the like, or any combination thereof, in a position facing at least substantially towards at least a portion of the secondary brake lock arm such that the pawl lock arm interface feature 214 is accessible to the lock arm for engagement therewith (e.g., upon a rotation of the lock arm). In various embodiments wherein the secondary brake assembly 200 is configured such that the secondary brake lock arm is positioned beneath the secondary brake pawl 210, the at least one pawl lock arm interface feature 214 may comprise a concave geometric feature 214*a* (e.g., a material recess) having an opening positioned along a bottom surface, and an interface protrusion 214*b* having an at least partially inward configuration relative to the concave geometric feature 214*a*, extending into the mouth of the opening so as to facilitate engagement with a portion of the secondary brake lock arm that is configured to extend into the concave geometric feature 214*a* when the lock arm is in an engaged position. For example, in various embodiments, the at least one pawl lock arm interface features 214 may be defined by a configuration that corresponds to and/or is complementary of that of the lock arm engagement element configured to engage pawl lock arm interface features 214. The interface protrusion 214*b* may be configured to at least partially facilitate the retention of the secondary brake lock arm relative to the arm interface features 214 of the secondary brake pawl 210.

In various embodiments, the secondary brake pawl 210 of an exemplary secondary brake assembly 200 may be configured to rotate throughout a range of relative rotational motion relative to the shuttle housing 11 between a disengaged position, shown in FIG. 3A, and an activated position, shown in FIG. 3B, based at least in part on the occurrence of a fall instance causing a variance in one or more forces (e.g., a gravitational force, and/or the like) being applied to the secondary brake assembly 200. As described herein, a disengaged position of the secondary brake assembly 200 may be defined at least in part by the secondary brake pawl 210 being arranged such that the second braking portion 211 is positioned within the interior housing portion of the shuttle housing 11. Further, in various embodiments, an activated position of the secondary brake assembly 200 may be defined by the secondary brake pawl 210 being rotated from the disengaged position about the secondary brake pawl pivot pin 212 (e.g., in a clockwise direction according to the exemplary orientation illustrated in FIGS. 3A and 3B) relative to the shuttle housing 11 such that the second braking portion 211 protrudes from the distal end 11*a* of the shuttle housing 11 via the one or more brake engagement slots 12. For example, the secondary brake pawl 210 may be configured such that, upon activation of the secondary brake assembly 200, the second braking portion 211 protruding from the shuttle housing 11 may physically engage a guide member 300 to prevent relative movement of the shuttle in one or more directions along the guide path 301.

In various embodiments, the secondary brake assembly 200 may define an inertial system. For example, in various embodiments, the secondary brake assembly 200 may further comprise a secondary brake spring 213 configured to apply one or more forces to the secondary brake pawl 210 to bias the rotation thereof about the second brake lever pivot pin 212. For example, as described herein, the secondary brake pawl 210 may be spring biased such that the force of gravity holds the secondary brake pawl 210 of the secondary brake assembly 200 in place during normal, non-fall-instance operations. For example, in an instance the shuttle apparatus 10 is not moving or moving slowly, the force of the secondary brake spring 213 may be counteracted may be counteracted by the force due to gravity, such that the secondary brake pawl 210 has minimal to no rotational movement. In particular, as described herein, the secondary brake spring 213 may be configured to bias the secondary brake pawl 210 towards an engaged position. In various embodiments, wherein the shuttle apparatus 10 is dynamically engaged with a guide member in an at least substantially vertical configuration and the shuttle apparatus 10 is not experiencing a fall instance, the gravitational forces acting on the secondary brake pawl 210 to oppose and/or counterbalance the spring bias forces being applied from the second brake spring 213 may be at least substantially maximized. For example, the second brake spring 213 may be calibrated to offset such maximized gravitational forces (e.g., in an exemplary vertical configuration in a non-fall instance), such that, for example, when the shuttle apparatus 10 provided in a vertical configuration is not moving or moving slowly, the force of the secondary brake spring 213 may be counteracted by the force due to gravity, thereby causing the secondary brake pawl 210 to have minimal to no rotational movement. In various embodiments, the sensitivity of the secondary brake pawl 210 (e.g., to one or more gravitational forces) may correspond to the configuration of the secondary brake spring 213 and, therefore, may be configured and/or calibrated by adjusting the configuration of the secondary brake spring 213. For example, in such an exemplary circumstance, the secondary brake assembly 200 may be configured such that the force due to gravity retains the secondary brake pawl 210 in a disengaged position, as illustrated in FIG. 3A.

In various embodiments, when the shuttle apparatus 10 experiencing a fall instance, the secondary brake assembly 200 may be configured such that the force of gravity may decrease on the secondary brake pawl 210. In such an exemplary circumstance, the force from the second brake spring 213 has little or no counter force due to gravity and, thus, may cause the secondary brake pawl 210 to rotate about the secondary brake pawl pivot pin 212 to the activated position. For example, one or more forces acting on the secondary brake pawl 210 from the secondary brake spring 213 may cause the rotation of the secondary brake pawl 210 about the secondary brake pawl pivot pin 212, such as, for example, in the clockwise direction (e.g., as defined by the orientation illustrated in FIG. 3B), such that the second braking portion 211 of the secondary brake pawl 210 extends through the shuttle housing 11 to an activated position, as illustrated in FIG. 3B. As an illustrative example, the activated position of the secondary brake pawl 210 may be defined by the second braking portion 211 protruding from the distal end 11*a* of the shuttle housing 11 via the one or more brake engagement slots 12 to engage and/or be engaged by the guide member (e.g., at a shuttle brake engagement feature) as the shuttle apparatus 10 moves in a downward direction along the guide path.

As shown, in various embodiments, the secondary brake pawl 210 of the secondary brake assembly 200 may be configured to move and/or operate independently of the first brake assembly 100 (e.g., the first brake lever 110), such that the secondary brake assembly 200 may provide a stopping force in an instance in which the braking lever does not function correctly. Additionally, it may provide additional stopping force in an instance in which the first brake assembly 100 is operating properly.

Figure 4A:
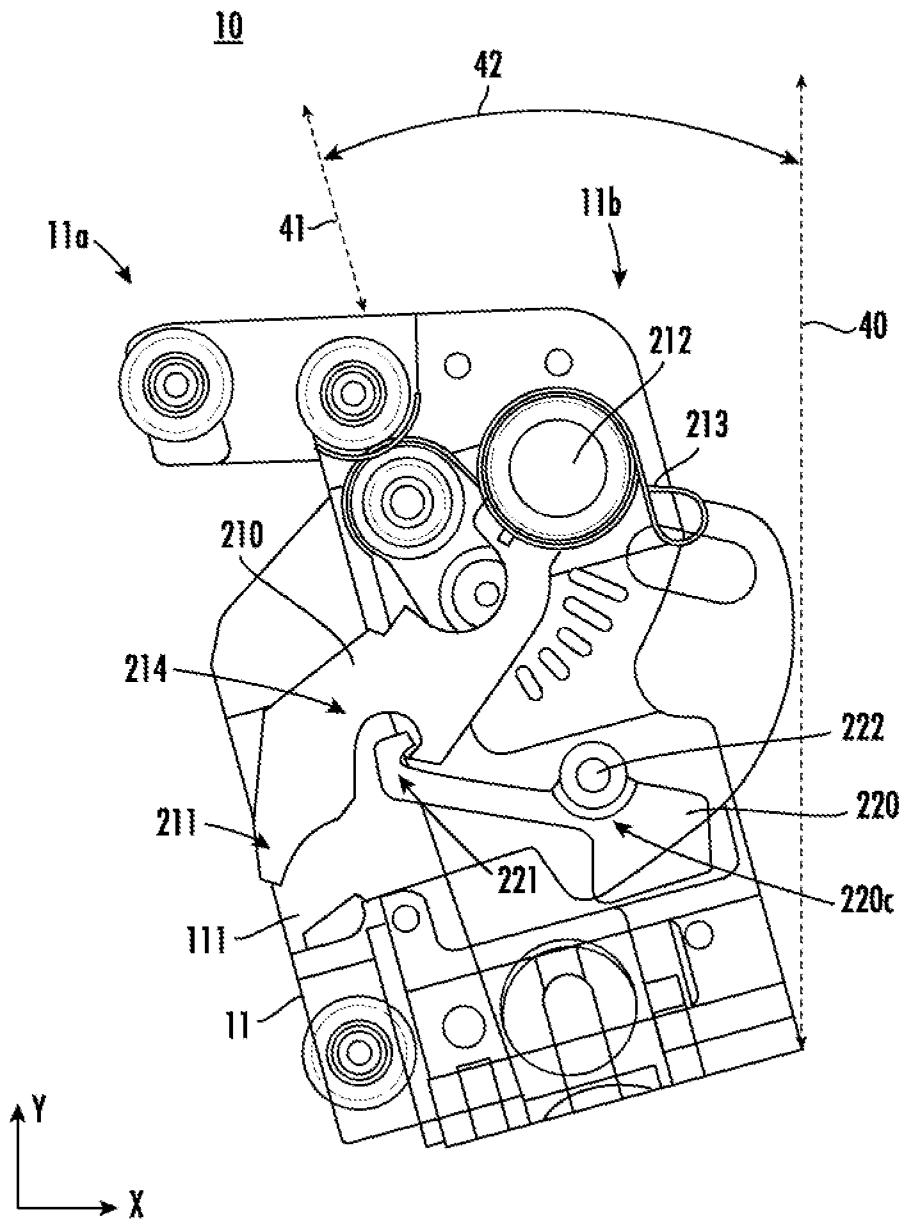
FIGS. 4A-4B illustrate various side cross-section views of exemplary shuttle apparatuses in accordance with various embodiments described herein.
Figure 4B:
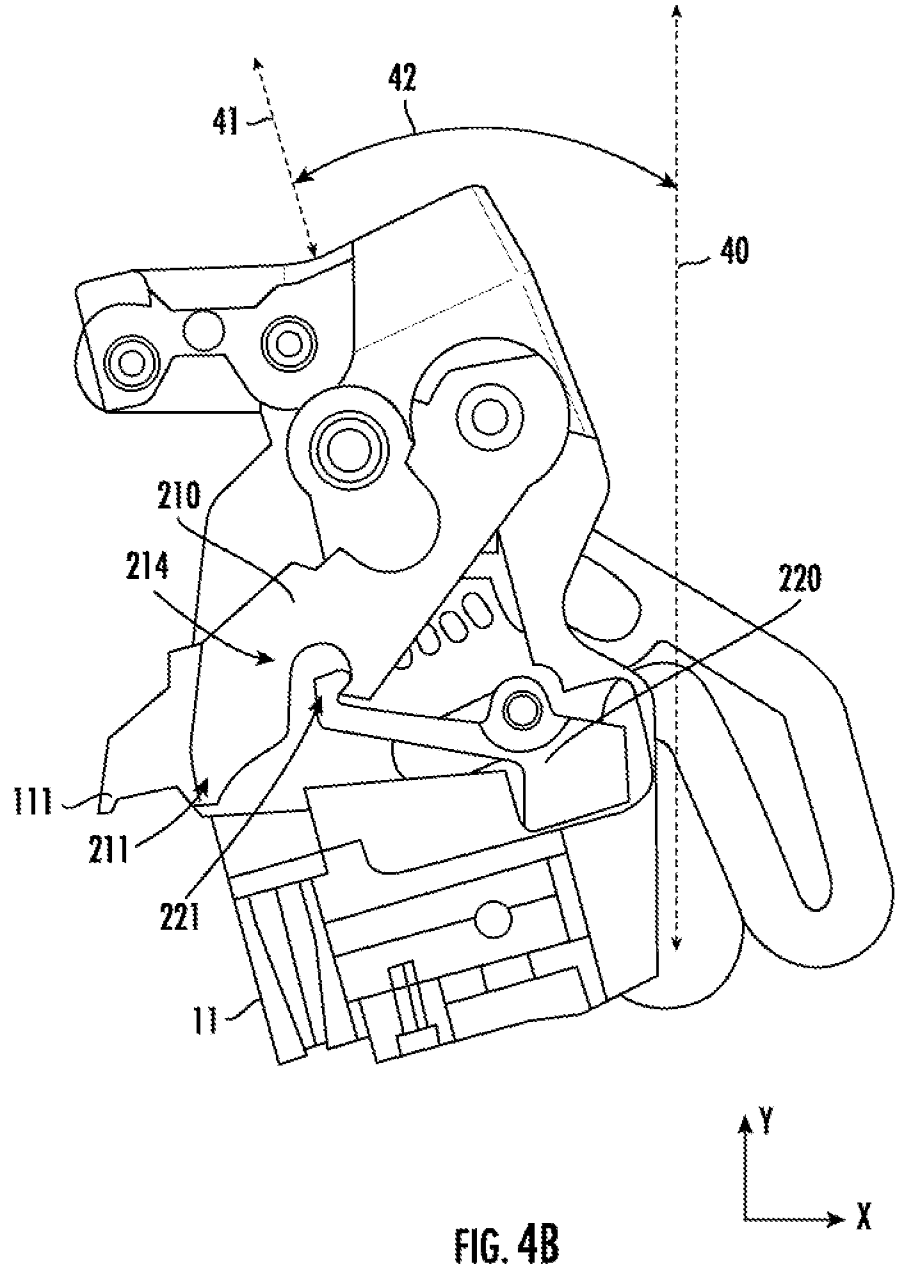

FIGS. 4A-4B illustrate various side cross-section views of exemplary shuttle apparatuses in accordance with various embodiments described herein. In particular, FIGS. 4A and 4B illustrate various side cross-section views of an exemplary shuttle apparatus 10 arranged in an angled configuration (e.g., relative to a vertical axis) with a secondary brake pawl 210 of a secondary brake assembly 200 being arranged in a deactivated configuration based at least in part on the arrangement of the secondary brake lock arm 220 in an engaged position.

As described herein, an exemplary secondary brake assembly 200 of a shuttle apparatus 10 may comprise a secondary brake lock arm 220 configured to, upon a shuttle housing 11 being provided in an angled configuration (e.g., relative to a vertical axis), freely rotate about a lock arm pivot 222 relative to the shuttle housing 11 to an engaged position in order to physically engage and obstruct the secondary brake pawl 210 from rotating to an activated position as the result of the angled configuration of the shuttle housing 11. For example, the secondary brake lock arm 220 may be configured for independent rotational movement about the lock arm pivot 222 such that the shuttle housing 11 being rearranged from a vertical configuration, as shown in FIGS. 3A and 3B, to an angled configuration, as illustrated in FIG. 4A (e.g., based on the arrangement of the guide member to which the shuttle apparatus 10 is dynamically engaged) does not result in the secondary brake lock arm 220 being rearranged relative to the vertical axis, but, rather, may result in an automatic movement of the secondary brake lock arm 220 throughout a range of relative rotational motion relative to the shuttle housing 11. For example, upon the shuttle apparatus 10 being arranged in an angular configuration defined by a shuttle tilt angle (e.g., defined relative to a vertical axis 40 such as, for example, the y-axis depicted in the exemplary orientation illustrated in FIGS. 3A and 3B) that defines a maximum shuttle tilt angle threshold, the secondary brake lock arm 220 may be configured in an engaged position defined relative to the secondary brake pawl 210 (e.g., positioned in a disengaged position) in order to deactivate the secondary brake assembly 200 by preventing rotation of the secondary brake pawl 210 to an activated position.

For example, FIGS. 4A and 4B illustrate exemplary shuttle apparatuses 10 wherein the exemplary shuttle apparatuses 10 are arranged in an angled configuration relative to a vertical axis 40 (e.g., a y-direction as defined in the exemplary orientation shown in FIG. 4A). As described herein, an angled configuration may be defined by a tilting of at least a portion of a guide member to which the shuttle apparatus 10 is engaged away from a vertical axis 40 such that the shuttle apparatus 10 provided along the tilted guide member portion is arranged in an at least substantially similar angled configuration relative to the vertical axis 40 (e.g., within an x-y plane, as shown in the exemplary orientation illustrated in FIG. 4A). For example, in various embodiments, an angled configuration of an exemplary shuttle apparatus 10 relative to a vertical axis within a particular plane (e.g., within an x-y plane, as shown in the exemplary orientation illustrated in FIG. 4A) may be defined in either first tilt direction (e.g., an upward angular configuration) or an opposite second tilt direction (e.g., a downward angular configuration). As an illustrative example, the exemplary shuttle apparatus 10 illustrated in FIG. 4A is illustrated an angled configuration that is defined by a shuttle tilt angle 42 comprising the angle between the vertical axis 40 and the shuttle axis 41 that corresponds to the tilt of the guide member portion to which the shuttle apparatus 10 is attached. In various embodiments, as illustrated in FIG. 4A, the angled configuration of the shuttle apparatus may define an upward angular configuration in an exemplary configuration wherein the proximal end 11*b* of the shuttle housing 11 is positioned in an at least partially upward-facing direction (e.g., at least partially in a positive y-direction, as defined according to the exemplary orientation illustrated in FIG. 4A).

In various embodiments, an exemplary shuttle apparatus 10 being arranged in an upward angled configuration may cause the secondary brake lock arm 220 to freely rotate relative to the shuttle housing 11 and the secondary brake pawl 210 disposed therein (e.g., in an unengaged position) so as to define an engaged position wherein the secondary lock arm 220 is abuts against the secondary brake pawl 210 to at least substantially mitigate the rotation of the secondary brake pawl 210 to an activated position. Such an exemplary angled configuration (e.g., wherein a shuttle apparatus 10 is provided in an upward angled configuration), may be further defined by the distal end 11*a* of the shuttle housing 11 being in a downward-facing position. For example, in such an exemplary circumstance, the angled configuration of the shuttle housing 11 causes the direction in which the force of gravity is acting on the secondary brake pawl 210 (e.g., at the center of mass 210*c* thereof) to be at least partially shifted such that the magnitude of the gravitational force offsetting the biasing spring force from the second brake spring 213 is decreased. As such, the force from the second brake spring 213 acting on the secondary brake pawl 210 in a first rotational direction (e.g., in the clockwise direction about the secondary brake pawl pivot pin 212 as defined by the exemplary orientation illustrated in FIGS. 4A and 4B) overcomes the gravitational counterforce acting on the secondary brake pawl 210 in an opposite second rotational direction (e.g., in the clockwise direction about the secondary brake pawl pivot pin 212 as defined by the exemplary orientation illustrated in FIGS. 4A and 4B), causing the secondary brake pawl 210 to rotate about the secondary brake pawl pivot pin 212 first rotational direction towards the activated position. In various embodiments, the secondary brake assembly 200 may be configured such that the shuttle apparatus 10 being provided in an angled configuration (e.g., an upward angled configuration) defined by a shuttle tilt angle 42 greater than or equal to a maximum shuttle tilt angle threshold may initiate a rotation of the secondary brake pawl 210 towards the activated position without the shuttle apparatus 10 experiencing a fall condition. For example, in various embodiments, the secondary brake assembly 200 may be configured such that the secondary brake pawl 210 may initiate a rotation from a disengaged position towards an activated position upon the shuttle apparatus 10 being arranged in an angled configuration (e.g., an upward angled configuration) defined by a shuttle tilt angle 42 (e.g., a maximum shuttle tilt angle threshold) of at least approximately between 10 degrees and 30 degrees (e.g., between 17 degrees and 23 degrees) relative to the vertical axis 40.

In various embodiments, the secondary brake lock arm 220 may be configured to prevent such a premature activation of the secondary brake assembly 200 resulting from the angular configuration of the shuttle apparatus 10. For example, the secondary brake lock arm 220 may be configured to freely rotate relative to the shuttle housing 11 such that, as the shuttle apparatus 10 is tilted in an upward angled configuration (as illustrated in FIG. 4A) at an increasing shuttle tilt angle 42, the secondary brake lock arm 220 may at least substantially continuously move (e.g., rotate about a lock arm pivot pin 222) relative to the shuttle housing 11 and/or the secondary brake pawl 210 disposed therein from a nominal position (as illustrated in FIG. 3A) to an engaged position (as illustrated in FIG. 4A), wherein at least a portion of the secondary brake lock arm 220 is positioned at least substantially adjacent a pawl lock arm interface feature 214 of the secondary brake pawl 210 to retain the secondary brake pawl 210 in the disengaged position by restricting the secondary brake pawl 210 from rotating toward the activated position. The secondary brake assembly 200 may be configured such that as the shuttle apparatus 10 is tilted in an upward angled configuration at an increasing shuttle tilt angle 42, the secondary brake lock arm 220 is fully rotated from the nominal position to an engaged position before the shuttle apparatus 10 reaches the maximum shuttle tilt angle threshold, as described herein. For example, in various embodiments, the secondary brake assembly 200 may be configured such that the secondary brake lock arm 220 may initiate a rotation from a nominal position towards an engaged position upon the shuttle apparatus 10 being arranged in an angled configuration (e.g., an upward angled configuration) defined by a shuttle tilt angle 42 (e.g., a maximum shuttle tilt angle threshold) of at least approximately between 7 degrees and 20 degrees (e.g., between 10 degrees and 15 degrees) relative to the vertical axis 40.

Figure 6:
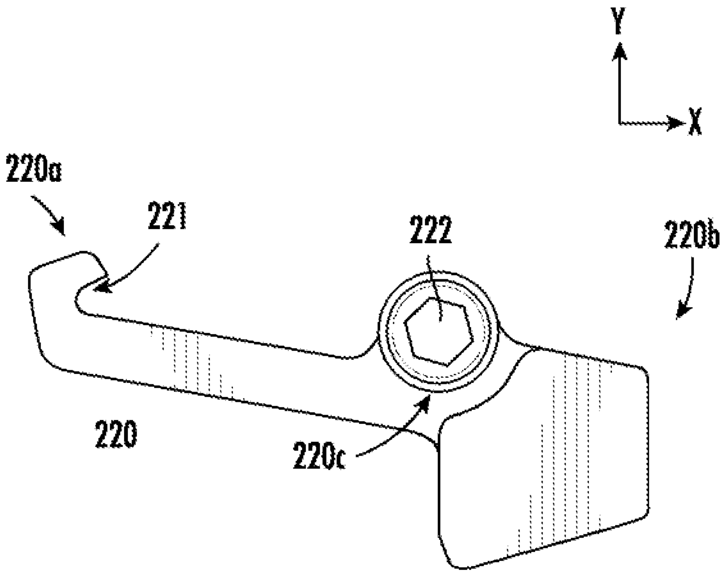
FIG. 6 illustrates side view of a secondary brake lock arm of a secondary brake assembly in accordance with an example embodiment of the present disclosure.

In various embodiments, the secondary brake assembly 200 may comprise a secondary brake lock arm 220 that is configured to rotate about an axis of rotation defined by a secondary brake lock arm pivot pin 222 independently of the angled configuration defined by the shuttle apparatus 10, based at least in part on one or more gravitational forces acting thereon, to be reconfigured relative to the secondary brake pawl 210 and facilitate physical engagement therebetween to lock the secondary brake pawl 210 in a disengaged position within the shuttle housing 11. For example, FIG. 6 illustrates a side view of an exemplary secondary brake lock arm of a secondary brake assembly in accordance with an example embodiment of the present disclosure. As illustrated, an exemplary secondary brake lock arm 220 of the secondary brake assembly 200 may extend along a length between a proximal lock arm end 220*b* and a distal lock arm end 220*a* that defines the lock arm engagement element 221. In various embodiments, the secondary brake lock arm pivot pin 222 may be defined along the length of the arm, such as, for example, along an upper portion of the secondary brake lock arm 220, as illustrated. For example, as illustrated, the secondary brake lock arm 220 may be configured such that the center of gravity 220*c* (e.g., the center of mass) of the secondary brake lock arm 220 is positioned at least substantially directly below an axis of rotation defined by the secondary brake lock arm pivot pin 222 (e.g., as measured in a vertical direction, such as, for example, the y-direction defined in the exemplary orientation illustrated in FIG. 6). In various embodiments, the center of mass 220*c* of the secondary brake lock arm 220 being defined directly below the secondary brake lock arm pivot pin 222 (e.g., the axis of rotation defined thereby) enables the angular configuration of the secondary brake lock arm 220 to be independent of and/or unaffected by the angular configuration of the shuttle apparatus 10, such that the secondary brake lock arm 220 exhibits a minimized amount of rotational movement about the secondary brake lock arm pivot pin 222 as the shuttle apparatus 10 is moving throughout various angled configurations defined by increasing and/or variable shuttle tilt angles. For example, in various embodiments, the angular configuration of the secondary brake lock arm 220 relative to a ground surface upon which a guide member dynamically engaged with the shuttle apparatus is positioned may remain at least substantially consistent independent of the shuttle housing 11 being rearranged in one or more tilted configurations.

In various embodiments, the secondary brake lock arm 220 may further comprise a lock arm engagement element 221 defined at a distal end 220*a* of the secondary lock arm 220 and configured to, upon the secondary lock arm 220 being arranged in an engaged position (as illustrated in FIG. 4A), engage the secondary brake pawl (e.g., a pawl lock arm interface feature) to facilitate the deactivation of the secondary brake assembly. For example, the lock arm engagement element 221 may comprise a feature, such as, for example, a protrusion and/or the like, or any geometric arm feature configured to facilitate an engagement between the secondary brake lock arm 220 and the secondary brake pawl in which the secondary brake pawl is obstructed, by the lock arm engagement element 221, from rotating to an activated position (e.g., secured within the interior housing portion of the shuttle housing). In various embodiments wherein the secondary brake assembly 200 is configured such that the secondary brake lock arm 220 is positioned beneath the secondary brake pawl, the arm engagement element 221 may comprise a protrusion extending from the distal lock arm end 220*a* in an at least partially upward configuration relative to an adjacent length of the lock arm 220 from which it extends to facilitate engagement with a corresponding portion of the secondary brake pawl that the engagement element 221 is configured to extend into (e.g., a concave geometric feature of the pawl lock arm interface feature) when the secondary brake lock arm 220 is in an engaged position. For example, in various embodiments, the lock arm engagement element 221 may be defined by a configuration that corresponds to and/or is complementary of that of the at least one pawl lock arm interface features configured to engage the lock arm engagement element 221. For example, as illustrated, a lock arm engagement element 221 of the secondary brake lock arm 220 may comprise an at least partially hooked profile, as shown, in order to facilitate a robust engagement with the pawl lock arm interface feature throughout a broad range of shuttle apparatus angled configurations defined by an increased range of shuttle tilt angles, as described herein.

Figure 7:
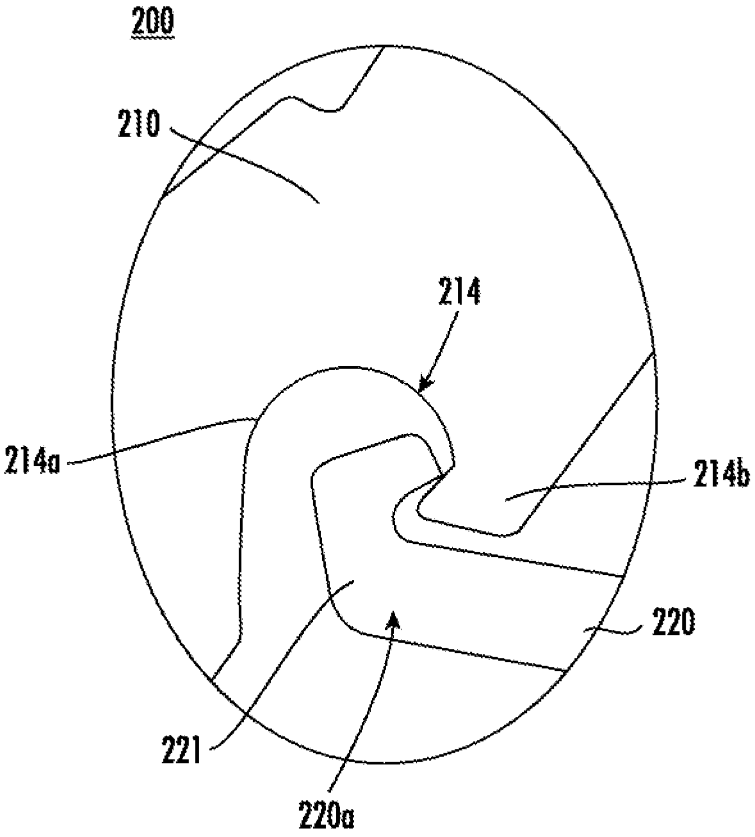
FIG. 7 illustrates an isolated cross-sectional side view of a secondary brake lock arm arranged in an engaged position relative to a secondary brake pawl in accordance with various example embodiments described herein.

As an illustrative example, FIG. 7 illustrates an isolated cross-sectional view of the secondary brake assembly 200 of an exemplary shuttle apparatus having a secondary brake pawl 210 being engaged at a pawl lock arm interface feature 214 by a lock arm engagement element 221 defined at a distal end of a secondary brake lock arm 220 arranged in an engaged position. For example, as illustrated, when the secondary brake lock arm is positioned in the engaged position relative to the secondary brake pawl 210, such as, for example, upon the shuttle apparatus being arranged in an angled configuration embodying an upward angled configuration defined by a shuttle tilt angle of at least approximately 15 degrees, as described herein, the protrusion defined by the lock arm engagement element 221 may extend at least partially into the concave geometric feature 214*a* of the secondary brake pawl 210, and the interface protrusion 214*b* of the pawl lock arm interface feature 214 may extend at least partially into the hooked profile defined by the lock arm engagement element 221 of the secondary brake lock arm 220.

In further reference to FIG. 4B, as illustrated in the exemplary embodiment and described herein, in various embodiments, the first brake lever 110 of the first brake assembly 100 may be configured to move and/or operate independently of the secondary brake pawl 210 of the secondary brake assembly 200, such that the first brake assembly 100 may be activated to provide a stopping force relative to the guide member in an instance in which the secondary brake assembly 200 has been deactivated resulting from the angled configuration of the shuttle apparatus causing the secondary brake lock arm 220 to automatically move to an engaged position relative to the secondary brake pawl 210 to prevent unintentional activation thereof.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shuttle apparatus for fall protection, the shuttle apparatus comprising:

- a shuttle housing configured for dynamic engagement relative to a guide member such that the shuttle housing is secured relative to the guide member and movable along a length of the guide member;
- a first brake assembly configured to be activated during a fall instance, wherein activation of the first brake assembly causes a first braking portion to engage the guide member; and
- a secondary brake assembly configured independent from the first brake assembly, the secondary brake assembly comprising:
  - a secondary brake pawl configured to pivotably rotate about a secondary brake pawl pivot pin between a disengaged position and an activated position, the secondary brake pawl configured to rotate toward the activated position during the fall instance; and a secondary brake lock arm configured to freely rotate independent of the shuttle housing such that the shuttle housing being arranged in an angled configuration relative to a vertical axis causes the secondary brake lock arm to be rotated relative to the shuttle housing to an engaged position, wherein the secondary brake lock arm in the engaged position is configured to obstruct a rotation of the secondary brake pawl to prevent the secondary brake assembly from being activated during the fall instance.

2. The shuttle apparatus of claim 1, wherein the secondary brake lock arm is configured to freely rotate about a secondary brake lock arm pivot pin disposed within the shuttle housing, and wherein the secondary brake lock arm in the engaged position obstructs a rotation of the secondary brake pawl by physically engaging the secondary brake pawl in the disengaged position to prevent the secondary brake pawl from rotating to the activated position.

3. The locking system of claim 2, wherein the secondary brake lock arm pivot pin defines an axis of rotation, the axis of rotation being defined at least substantially adjacent an upper portion of the secondary brake lock arm.

4. The locking system of claim 3, wherein a lock arm center of gravity of the secondary brake lock arm is defined at least substantially directly below the lock arm axis of rotation.

5. The locking system of claim 2, wherein the secondary brake pawl comprises at least one pawl lock arm interface feature configured to be engaged by the secondary brake lock arm when the secondary brake lock arm is in the engaged position, wherein the secondary brake lock arm physically engages the secondary brake pawl in the disengaged position at the one pawl lock arm interface feature to facilitate the deactivation of the secondary brake assembly.

6. The locking system of claim 5, wherein the at least one pawl lock arm interface feature is defined along an at least substantially bottom portion of the secondary brake pawl.

7. The locking system of claim 6, wherein the secondary brake lock arm comprises a lock arm engagement element defined at a distal end thereof, the lock arm engagement element being configured to engage the at least one pawl lock arm interface feature of the secondary brake pawl when the secondary brake lock arm is in the engaged position.

8. The locking system of claim 7, wherein the at least one pawl lock arm interface feature are defined by a configuration that corresponds to that of the lock arm engagement element such that the at least one pawl lock arm interface feature is configured to receive at least a portion of the lock arm engagement element.

9. The locking system of claim 1, wherein a pawl center of gravity of the secondary brake pawl is defined towards the first braking portion.

10. The shuttle apparatus of claim 1, wherein the secondary brake assembly defines an inertial system, the secondary brake assembly being configured to be activated during the fall instance based at least in part on a variance in a gravitational force acting on the secondary brake pawl, the variance in the gravitational force being caused by the fall instance.

11. The shuttle apparatus of claim 10, wherein the secondary brake assembly comprises a secondary brake spring configured to bias the secondary brake pawl against rotation due to gravity in an instance in which the locking system has little or no movement.

12. The shuttle apparatus of claim 11, wherein the variance in the gravitational force caused by the fall instance is defined by a decrease in the gravitational force acting against the secondary brake spring, and wherein the secondary brake spring is calibrated to the gravitational force acting on the secondary brake pawl in a non-fall instance such that, in a fall instance, the secondary brake pawl is biased to rotate about the secondary brake pawl pivot pin toward the activated position.

13. The shuttle apparatus of claim 1, wherein the secondary brake pawl comprises a second braking portion configured to be positioned external to the shuttle housing in the activated position, wherein activation of the first brake assembly causes the second braking portion to engage the guide member.

14. The shuttle apparatus of claim 13, wherein the secondary brake lock arm being arranged in the engaged position to prevent the secondary brake assembly from being activated during the fall instance comprises the secondary brake lock arm retaining the second braking portion of the secondary brake pawl within an interior housing portion defined within the shuttle housing such that the secondary brake pawl does not extend through a brake engagement slot defined along a distal end of the shuttle housing.

15. The shuttle assembly of claim 1, wherein the second brake assembly is configured such that, upon the shuttle housing being rearranged from the angled configuration to a vertical configuration defined by a shuttle tilt angle that is at least substantially zero, the secondary brake lock arm is rotated relative to the shuttle housing from the engaged position to a nominal position, wherein the secondary brake lock arm in the nominal position is configured to allow the rotation of the secondary brake pawl from a disengaged position to an activated position in the fall instance.

16. The shuttle assembly of claim 1, wherein the secondary brake lock arm being rotated relative to the shuttle housing based at least in part on the angled configuration of the shuttle housing is defined by the secondary brake lock arm at least substantially maintaining a nominal position relative to the vertical axis.

17. The shuttle apparatus of claim 1, wherein the secondary brake assembly is configured such that, based at least in part on the angled configuration of the shuttle housing, the secondary brake lock arm is fully rotated relative to the shuttle housing from a nominal position to the engaged position before the shuttle apparatus being tilted to an increased angled configuration defined by a maximum shuttle tilt angle threshold, wherein the maximum shuttle tilt angle threshold is defined by a shuttle tilt angle value at which the secondary brake pawl initiates a rotation caused by a variance in gravitational forces resulting from the increased angled configuration.

18. The shuttle apparatus of claim 1, wherein the secondary brake assembly is configured such that the secondary brake lock arm is arranged in the engaged position upon the angled configuration of the shuttle housing being defined by a shuttle tilt angle that is between 10 degrees and 20 degrees relative to the vertical axis.

19. The shuttle apparatus of claim 1, further comprising one or more guide wheel assemblies configured to engage one or more surfaces of the guide member to facilitate a relative movement of the shuttle apparatus along the length of the guide member.

20. The shuttle apparatus of claim 1, wherein the first brake assembly is configured to move independently of the secondary brake pawl of the secondary brake assembly such that as the secondary brake lock arm is preventing the second brake assembly from being activated during the fall instance, the first brake assembly may be activated to provide a stopping force relative to the guide member.

* * * * *